United States Patent
Chang et al.

(10) Patent No.: US 9,908,201 B2
(45) Date of Patent: Mar. 6, 2018

(54) SYSTEMS AND METHODS FOR EDGE BEAD REMOVAL

(71) Applicant: Taiwan Semiconductor Manufacturing Company Limited, Hsinchu (TW)

(72) Inventors: Chun-Hao Chang, Keelung (TW); Hsueh-Yi Chung, Hsinchu County (TW); Shang-Yun Huang, Hsinchu County (TW); Jui-Ping Chuang, Hsinchu (TW); Li-Kong Turn, Taichung (TW); Fei-Gwo Tsai, Taipei (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 540 days.

(21) Appl. No.: 14/258,503

(22) Filed: Apr. 22, 2014

(65) Prior Publication Data

US 2015/0298262 A1 Oct. 22, 2015

(51) Int. Cl.
*B23K 26/36* (2014.01)
*B23K 26/361* (2014.01)
*B23K 26/362* (2014.01)
*B23K 26/38* (2014.01)
*B23K 103/00* (2006.01)

(52) U.S. Cl.
CPC ............ *B23K 26/361* (2015.10); *B23K 26/36* (2013.01); *B23K 26/362* (2013.01); *B23K 26/38* (2013.01); *B23K 2203/50* (2015.10); *B23K 2203/56* (2015.10)

(58) Field of Classification Search
CPC .... B23K 26/36; B23K 26/361; B23K 26/362; B23K 26/38
See application file for complete search history.

(56) References Cited

U.S. PATENT DOCUMENTS

| 6,874,510 | B2* | 4/2005 | Reder | B08B 7/0042 134/1 |
| 8,334,162 | B2* | 12/2012 | Catalano | H01L 31/1876 136/256 |
| 8,778,799 | B2* | 7/2014 | Souter | B23K 26/06 257/528 |
| 2005/0020087 | A1* | 1/2005 | Wagner | B23K 26/0738 438/700 |
| 2010/0159634 | A1* | 6/2010 | Su | H01L 31/18 438/96 |
| 2011/0139757 | A1* | 6/2011 | Millman, Jr. | B23K 26/0676 219/121.69 |

\* cited by examiner

*Primary Examiner* — Ryan A Reis
(74) *Attorney, Agent, or Firm* — Jones Day

(57) ABSTRACT

Systems and methods are provided for edge bead removal. A laser beam of approximately a wavelength is received. The laser beam is delivered along a predetermined beam path. The laser beam is projected on an edge portion of a wafer for edge bead removal.

21 Claims, 5 Drawing Sheets

SYSTEMS AND METHODS FOR EDGE BEAD REMOVAL

BACKGROUND

The technology described in this disclosure relates generally to semiconductor devices and more particularly to fabrication of semiconductor devices.

Light sensitive materials (e.g., photoresist) are often applied to a semiconductor wafer for device fabrication. For example, a wafer is held on a rotating chuck, and the diameter of the chuck is slightly less than the diameter of the wafer. Liquid light sensitive materials are applied onto a top surface of a wafer when the wafer is spinning with the chuck. The light sensitive materials spread radially outward from the center of the wafer towards the edge to coat the top of the wafer. Ideally, excess light sensitive materials are ejected from the edge of the wafer. In practice, however, some excess light sensitive materials often tend to collect at and form one or more beads along the edge of the wafer. Usually, an ARC lamp is used to emit light beams on an edge portion of the wafer for edge bead removal. An ARC lamp usually involves two electrodes (e.g., made from tungsten) separated by a gas in a bulb and the gas contained in the bulb may include neon, argon, xenon, krypton, sodium, metal halide, and/or mercury.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
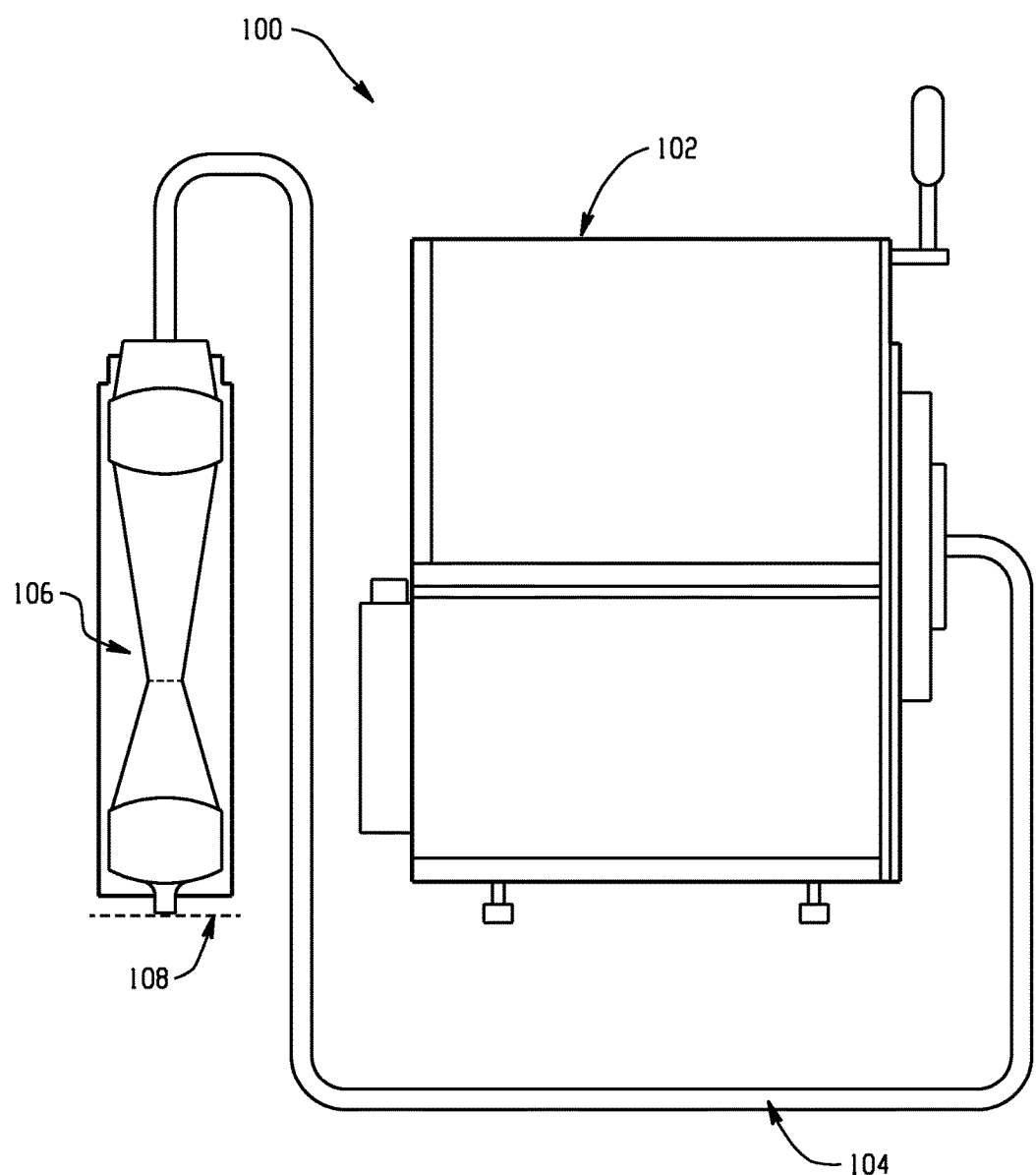
FIG. 1 depicts an example diagram showing a system with a laser source for edge bead removal, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "on," "in," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The system may be otherwise oriented (rotated 90 degrees or at other orientations) and the spatially relative descriptors used herein may likewise be interpreted accordingly.

Edge bead removal using an ARC lamp has some disadvantages. For example, the ARC lamp often emits light beams of different wavelengths in a relatively large bandwidth. A large transition area may be formed in underexposed areas of light sensitive materials (e.g., photoresist) due to diffraction at a sleeve edge of a mask, and result in abnormal patterns of the light sensitive materials at an edge of a wafer, which may cause the light sensitive materials at the edge of the wafer to peel off or deform.

FIG. 1 depicts an example diagram showing a system with a laser source for edge bead removal, in accordance with some embodiments. As shown in FIG. 1, the system 100 includes a laser source 102 (e.g., an eximer laser) that emits a laser beam of approximately a single wavelength (e.g., 193 nm) for edge bead removal.

Specifically, light sensitive materials (e.g., photoresist) are applied to a semiconductor wafer 108 for device fabrication. The light sensitive materials spread radially outward from the center of the wafer towards the edge to coat the top of the wafer 108. Some excess light sensitive materials form one or more beads along the edge of the wafer 108. A beam delivery component 104 (e.g., one or more beam delivery tubes including optical fiber-based components) delivers the laser beam from the laser source 102 along a predetermined beam path, and an optical assembly 106 (e.g., a projection lens) projects the laser beam on an edge portion of the wafer 108 for edge bead removal. For example, the system 100 further includes a developing component for removing the edge beads on the wafer after the laser beam exposure for device fabrication.

Figure 2:
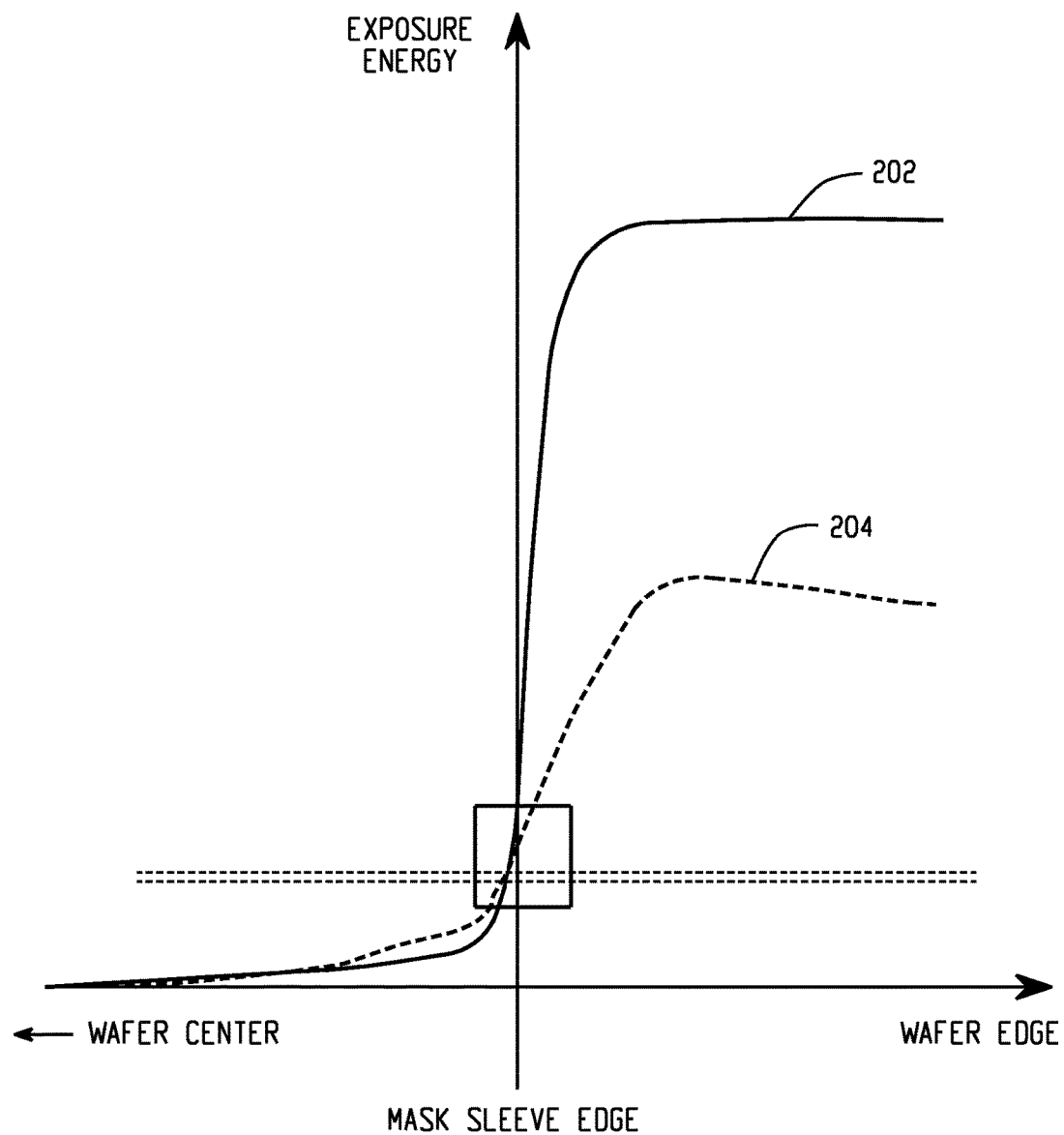
FIG. 2 depicts an example diagram showing a comparison of exposure energy profiles for a laser source and an ARC lamp, in accordance with some embodiments.

FIG. 2 depicts an example diagram showing a comparison of exposure energy profiles for a laser source and an ARC lamp, in accordance with some embodiments. As shown in FIG. 2, the laser source 102 causes a better exposure energy profile 202 than the ARC lamp. At a mask sleeve edge, the exposure energy of the laser source 102 and the exposure energy of an ARC lamp are comparable. However, as shown by the exposure energy profiles 202 and 204, from the mask sleeve edge toward the center of the wafer 108, the exposure energy (e.g., largely from diffraction) decreases much slower for the ARC lamp than for the laser source 102. On the other hand, from the mask sleeve edge toward the edge of the wafer 108, the exposure energy increases much slower for the ARC lamp than for the laser source 102.

Figure 3:
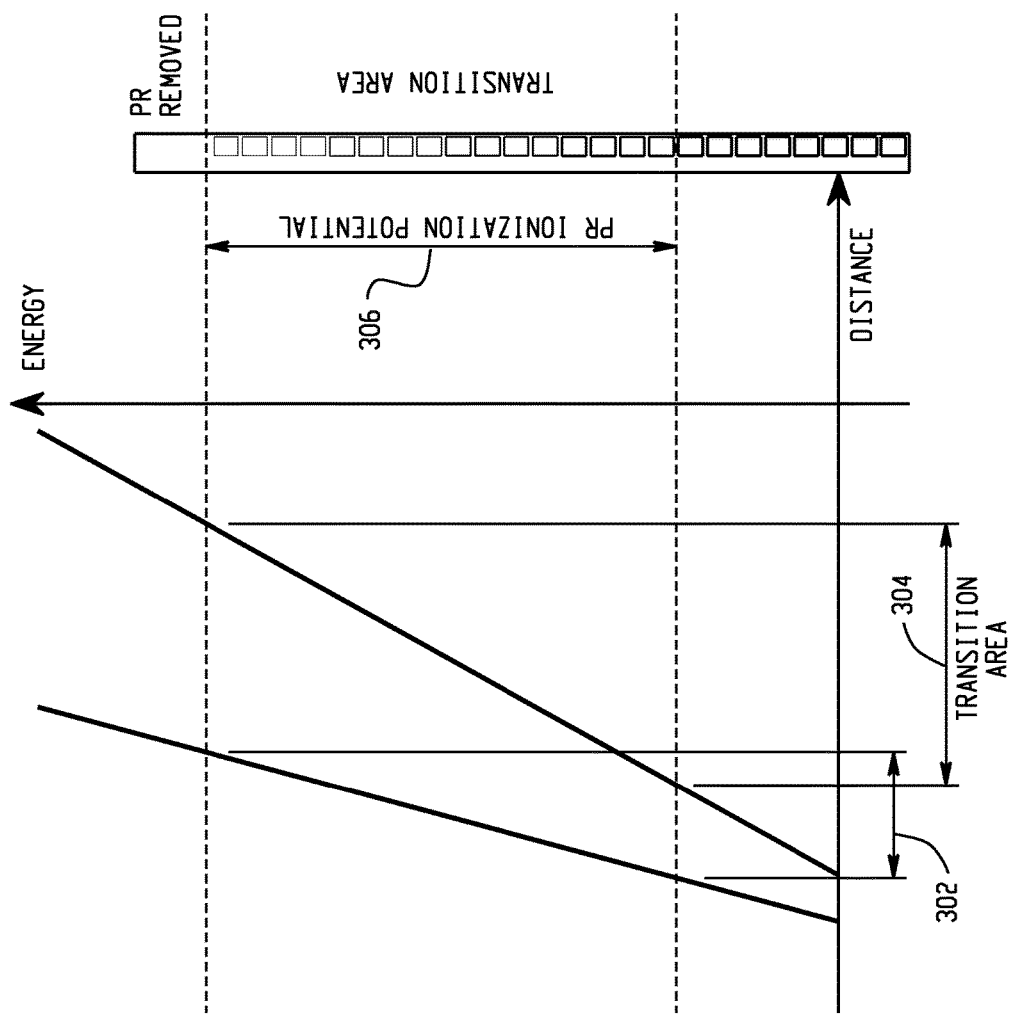
FIG. 3 depicts an example diagram showing a comparison of transition areas for a laser source and an ARC lamp, in accordance with some embodiments.

FIG. 3 depicts an example diagram showing a comparison of transition areas for a laser source and an ARC lamp, in accordance with some embodiments. As shown in FIG. 3, the transition area 302 corresponding to the laser source 102 is much smaller than the transition area 304 of the ARC lamp, which is associated with the exposure energy profiles as shown in FIG. 2.

Specifically, the transition areas correspond to a particular exposure energy range 306. With exposure energy beyond the energy range 306, the light sensitive materials (e.g., photoresist) are fully exposed and can be removed completely from the wafer 108. On the other hand, the light sensitive materials (e.g., photoresist) are not sufficiently exposed and remain on the wafer 108 with exposure energy below the energy range 306. Within the exposure energy range 306, the light sensitive materials (e.g., photoresist) are exposed to some extent and can be partially removed from the wafer 108.

The exposure energy associated with the laser source 102 is related to the wavelength of the laser beam and the intensity of the laser beam. In some embodiments, the system 100 adjusts the wavelength of the laser beam, or increases the intensity of the laser beam to change the exposure energy to reduce the transition area which results from, e.g., diffraction at the mask sleeve edge.

Figure 4:
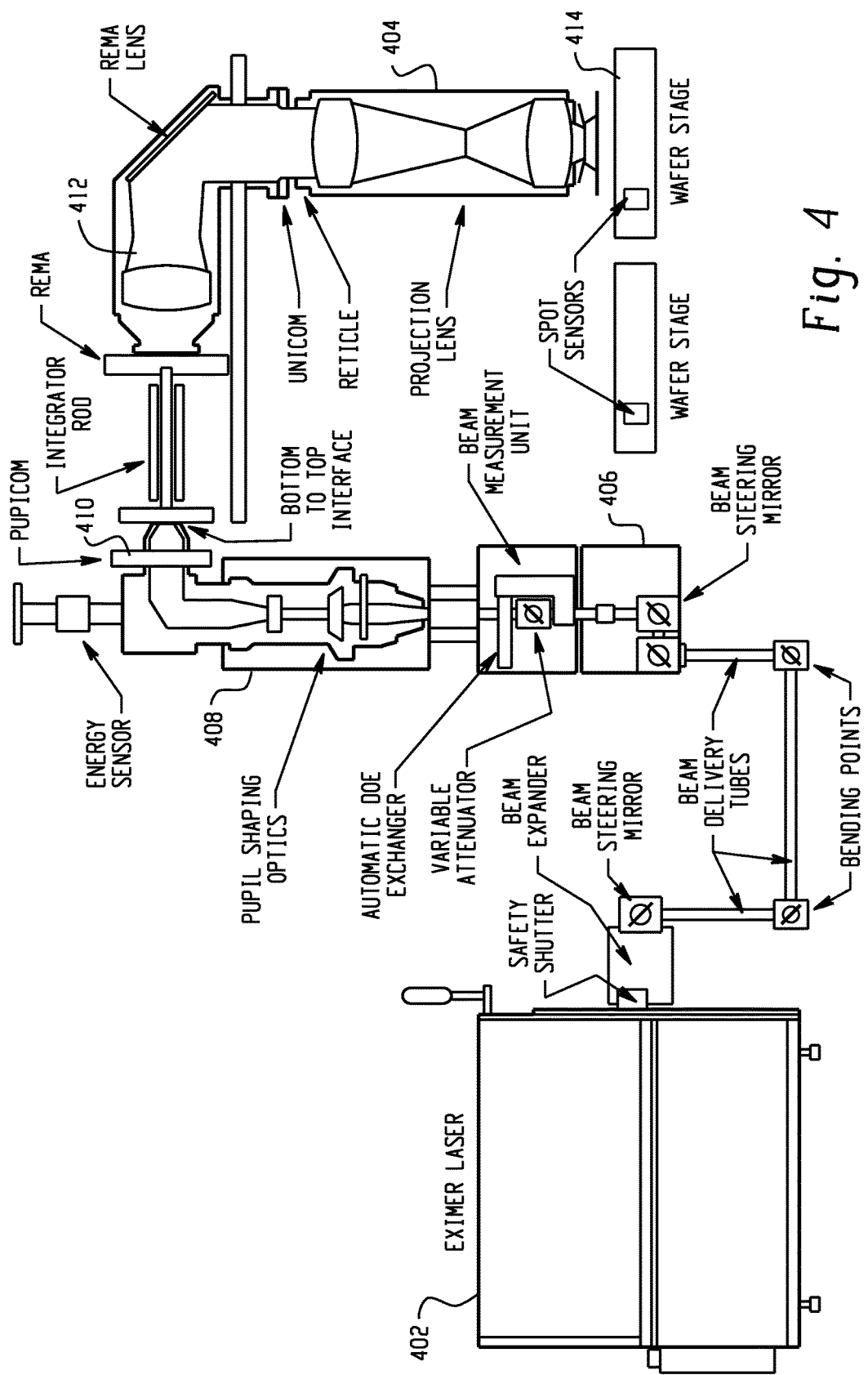
FIG. 4 depicts another example diagram showing a system with a laser source for edge bead removal, in accordance with some embodiments.

FIG. 4 depicts another example diagram showing a system with a laser source for edge bead removal, in accordance with some embodiments. As shown in FIG. 4, an eximer laser 402 is used as a laser source for emitting a laser beam that is delivered through one or more beam delivery components toward a project lens 404 for edge bead removal.

Specifically, the eximer laser 402 generates a laser beam that goes through a beam expander when a safety shutter is opened. The laser beam is steered by one or more beam steering mirrors toward one or more beam delivery tubes (e.g., optical fiber-based) that deliver the laser beam to a beam processing component 406. The beam processing unit 406 includes one or more beam steering mirrors, a variable attenuator, a beam measurement unit, and an automatic diffractive-optical-element (DOE) exchanger. The laser beam then goes through a beam shaping component 408 (e.g., pupil shaping optics), a pupil correction module 410 (e.g., pupicom), and an integrator rod. A reticle-edge-masking assembly (REMA) 412 defines the shape of the laser beam that passes through an internal mask plane. For example, the REMA includes expansion optics, a mirror for directing the laser beam toward a mask, and a condenser lens. The laser beam is projected by the projection lens 404 onto a wafer on a wafer stage 414.

Figure 5:
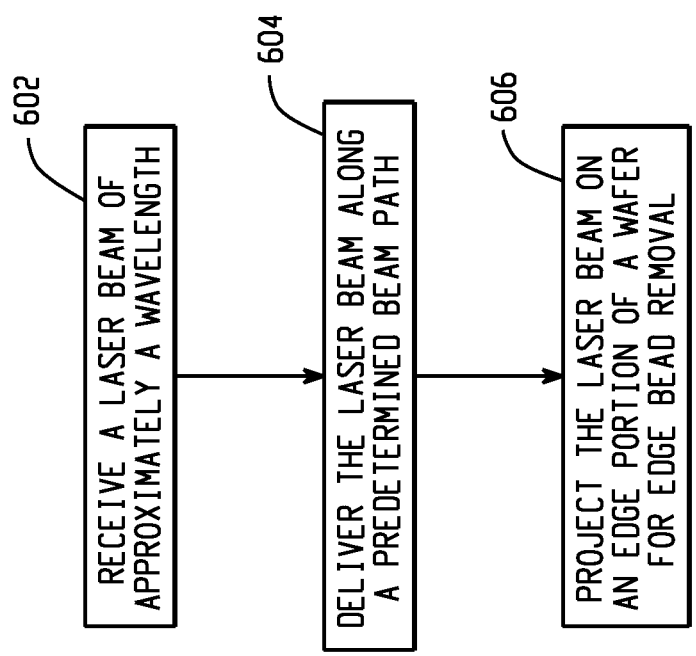
FIG. 5 depicts an example flow chart for edge bead removal, in accordance with some embodiments.

FIG. 5 depicts an example flow chart for edge bead removal, in accordance with some embodiments. At 602, a laser beam of approximately a wavelength is received. At 604, the laser beam is delivered along a predetermined beam path. At 606, the laser beam is projected on an edge portion of a wafer for edge bead removal.

Figure 6:
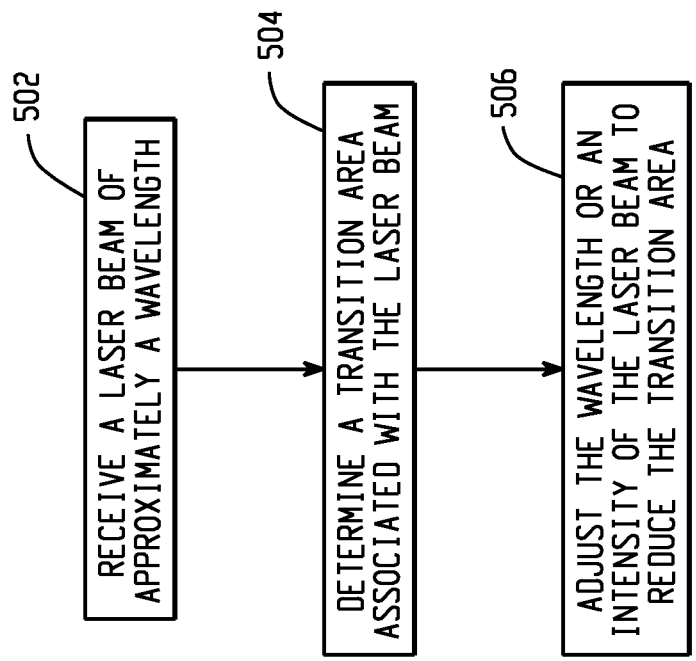
FIG. 6 depicts another example flow chart for edge bead removal, in accordance with some embodiments.

FIG. 6 depicts another example flow chart for edge bead removal, in accordance with some embodiments. At 502, a laser beam of approximately a wavelength is received. The laser beam is delivered along a predetermined beam path and projected on an edge portion of a wafer for edge bead removal. At 504, a transition area associated with the laser beam is determined. At 506, the wavelength or an intensity associated with the laser beam is adjusted to reduce the transition area.

According to one embodiment, a system for edge bead removal includes: a laser source configured to emit a laser beam of approximately a wavelength, a beam delivery component configured to deliver the laser beam along a predetermined beam path, and an optical assembly configured to project the laser beam on an edge portion of a wafer for edge bead removal.

According to another embodiment, a method is provided for edge bead removal. A laser beam of approximately a wavelength is received. The laser beam is delivered along a predetermined beam path. The laser beam is projected on an edge portion of a wafer for edge bead removal.

According to yet another embodiment, a method is provided for edge bead removal. A laser beam of approximately a wavelength is received. The laser beam is delivered along a predetermined beam path and projected on an edge portion of a wafer for edge bead removal. A transition area associated with the laser beam is determined. The wavelength or an intensity associated with the laser beam is adjusted to reduce the transition area.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for edge bead removal, comprising:
    a laser source configured to emit a laser beam of approximately a wavelength;
    a beam delivery component configured to deliver the laser beam along a predetermined beam path;
    a reticle-edge-masking assembly on the predetermined beam path configured to define a shape of the laser beam; and
    an optical assembly configured to project the laser beam on an edge portion of a wafer for exposing an edge bead.

2. The system of claim 1, wherein the wavelength corresponds to about 193 nm.

3. The system of claim 1, wherein the beam delivery component includes one or more optical fiber-based components.

4. The system of claim 1, wherein the predetermined beam path includes a beam shaping component.

5. The system of claim 1, wherein the laser source includes one or more eximer lasers.

6. The system of claim 1, wherein the edge portion of the wafer includes one or more edge beads of a light sensitive material.

7. The system of claim 6, wherein the light sensitive material includes photoresist.

8. The system of claim 1, wherein the laser source is configured to increase intensity of the laser beam to reduce a transition area near the edge portion of the wafer on which the laser beam is projected.

9. The system of claim 1, wherein the laser source is configured to change the wavelength of the laser beam to reduce a transition area near the edge portion of the wafer on which the laser beam is projected.

10. A method for edge bead removal, comprising:
    receiving a laser beam of approximately a wavelength;
    delivering the laser beam along a predetermined beam path;
    defining a shape of the laser beam using a reticle-edge-masking assembly on the predetermined beam path; and
    projecting, through a projection lens, the laser beam on an edge portion of a wafer for edge bead removal.

11. The method of claim 10, wherein the wavelength corresponds to about 193 nm.

12. The method of claim 10, wherein the laser beam is delivered through optical fibers.

13. The method of claim 10, wherein the predetermined beam path includes a beam shaping component.

14. The method of claim 10, wherein the laser beam is emitted from one or more eximer lasers.

15. The method of claim 10, further comprising:
applying a light sensitive material on the wafer;
wherein the edge portion of the wafer includes one or more edge beads of the light sensitive material.

16. The method of claim 15, further comprising:
removing the edge beads of light sensitive material on the edge portion of the wafer after the projection of the laser beam.

17. The method of claim 10, further comprising:
increasing intensity of the laser beam to reduce a transition area near the edge portion of the wafer on which the laser beam is projected.

18. The method of claim 10, further comprising:
changing the wavelength of the laser beam to reduce a transition area near the edge portion of the wafer on which the laser beam is projected.

19. A method for edge bead removal, comprising:
receiving a laser beam of approximately a wavelength;
wherein the laser beam is delivered along a predetermined beam path and projected on an edge portion of a wafer for edge bead removal;
determining a transition area associated with the laser beam; and
adjusting the wavelength or an intensity associated with the laser beam to reduce the transition area, wherein the predetermined beam path includes:
a pupicom;
an integrator rod;
a reticle-edge-masking assembly; and
a projection lens.

20. The system of claim 1, wherein the optical assembly includes a projection lens.

21. The system of claim 1, wherein the reticle-edge-masking assembly comprises expansion optics, a mirror configured to direct the laser beam towards a mask, and a condenser lens.

* * * * *